United States Patent [19]

Brasfield

[11] 4,428,016

[45] Jan. 24, 1984

[54] OVERLOAD PROTECTED SWITCHING REGULATOR

[75] Inventor: Robert G. Brasfield, Seattle, Wash.

[73] Assignee: The Boeing Company, Seattle, Wash.

[21] Appl. No.: 268,242

[22] Filed: May 29, 1981

Related U.S. Application Data

[63] Continuation-in-part of Ser. No. 212,235, Dec. 2, 1980, abandoned.

[51] Int. Cl.³ .......................... H02H 3/08; H02H 7/20
[52] U.S. Cl. ........................................ 361/18; 361/93; 361/103; 361/106; 361/100
[58] Field of Search ................... 361/18, 93, 103, 106, 361/100; 323/282, 283, 284, 285, 288, 271, 277, 278; 363/50, 52, 53, 41, 26, 25, 19

[56] References Cited

U.S. PATENT DOCUMENTS

| | | | |
|---|---|---|---|
| 3,341,765 | 9/1967 | Rogers | 363/26 |
| 3,360,711 | 12/1967 | Dinger | 363/41 |
| 3,402,342 | 9/1968 | Wagner | 363/26 |
| 3,443,193 | 5/1969 | Horner | 363/41 |
| 3,449,680 | 6/1969 | Schilb et al. | 330/207 P |
| 3,551,777 | 12/1970 | Bingley | 363/26 |
| 3,559,030 | 1/1971 | Bussard | 363/26 |
| 3,582,713 | 6/1971 | Till | 361/18 X |
| 3,614,587 | 10/1971 | Schwartz | 363/26 |
| 3,764,884 | 10/1972 | Reeve | 363/41 |
| 3,789,288 | 1/1974 | Assow et al. | 363/26 |
| 3,819,992 | 6/1974 | Opal et al. | 363/41 |
| 3,859,583 | 1/1975 | Reed | 363/26 |
| 3,868,554 | 2/1975 | Konrad | 361/103 X |
| 3,879,647 | 4/1975 | Hamilton | 363/50 X |
| 3,942,075 | 3/1976 | Maran et al. | 361/106 |
| 3,956,684 | 5/1976 | Walden | 361/103 X |
| 3,988,643 | 10/1976 | Morris | 361/18 |
| 4,020,408 | 4/1977 | Grant | 363/41 |
| 4,045,887 | 9/1977 | Nowell | 361/18 X |
| 4,127,885 | 11/1978 | Adam et al. | 361/18 |
| 4,148,097 | 4/1979 | Deisch | 363/26 |

OTHER PUBLICATIONS

B. H. Hamilton, "Pulse Modulator and Signal Processing . . . ", IEEE Translations on Industry Applications, vol. IA-12, No. 4, Jul. 1, 1976, pp. 378-386.
Editors Choice: New Products "Current Sense Latch Provides . . . ", EDN Apr. 5, 1980, p. 73.

*Primary Examiner*—Patrick R. Salce
*Attorney, Agent, or Firm*—Christensen, O'Connor, Johnson & Kindness

[57] ABSTRACT

An overload protected switching regulator for applying power to a load is disclosed. A power switch (PS1, PS2), connected to control the flow of current between the DC input and the output of the regulator, is closed at a fixed rate each time a flip-flop (23, 33) is set by a pulse produced by an oscillator (21, 31). When the regulator is operated at its rated current, or less, an output voltage detector (25, 37) applies a pulse to the reset input of the flip-flop (23, 33) during each period of oscillation. The timing of the reset pulse is such that the open/closed ratio of the power switch (PS1, PS2) is the exact ratio required to maintain the output voltage of the regulator at the desired level. A current limit detector (27, 39) detects current flow through the power switch. In the event abnormal loading occurs, whereby the current flow through the power switch attempts to exceed its rated value, the current limit detector (27, 39) generates a pulse that resets the flip-flop (23, 33) prior to the voltage detector (25, 37) producing a reset pulse.

22 Claims, 7 Drawing Figures

OVERLOAD PROTECTED SWITCHING REGULATOR

CROSS-REFERENCE TO RELATED APPLICATION

This application is a continuation-in-part of U.S. application Ser. No. 212,235, filed Dec. 2, 1980 and entitled "Overload Protected Switching Regulator", and now abandoned.

TECHNICAL AREA

This invention is directed to DC voltage regulators and, more particularly, switching type DC voltage regulators.

BACKGROUND OF THE INVENTION

In the past, various types of DC voltage regulators have been developed. DC voltage regulators normally receive a DC input voltage at a relatively high level and produce a DC output voltage at a lower level. The DC input voltage may be fluctuating, i.e., unregulated. Contrariwise, the output voltage is regulated, i.e., maintained at a predetermined potential level with respect to ground or some reference voltage.

One type of DC voltage regulator is the switching regulator. In a switching regulator a switch is turned on and off at a fixed or variable rate. With either a fixed or variable rate, the on-off time ratio of the switch is controlled such that the DC output voltage remains at a predetermined level as the source voltage or the load changes. Many prior art switching regulators do not include overload protection because, prior to the present invention, the inclusion of an adequate overload protection system in a switching-type regulator required complex output current sensing and control circuits. Yet, overload protection is desirable because a shorted regulator output or an exceedingly high load can draw current through the regulator switch (which is usually a semiconductor) greater than its rated value. In the absence of some form of overload protection, a short or an overload condition can damage or completely destroy the regulator. Simple fusing of such regulators is an unacceptable solution to this problem because the response time of fuses cannot be suitably matched to the protection requirements of semiconductor switching devices over the complete range of overload conditions.

Therefore, it is an object of this invention to provide a new and improved switching regulator.

It is a further object of this invention to provide an overload protected switching regulator.

In the past, as noted above, regulators have provided an output voltage regulated or referenced with respect to ground or some reference voltage level, frequently the regulator input voltage level. In other words, in one form of switching regulator, the regulator output voltage is regulated with respect to ground (zero voltage), whereas in the other form of switching regulator, the regulator output voltage is regulated with respect to some other voltage, such as the regulator input voltage. In either case, the differential voltage across the output of the switching regulator (i.e., the load voltage) is regulated. Obviously, it would be desirable to provide overload protected switching regulators useful in either of these environments.

Therefore, it is an object of this invention to provide an overload protected switching regular useful in systems wherein the output of the regulator is referenced to a zero voltage level (e.g., ground).

It is another object of this invention to provide an overload protected switching regulator useful in systems wherein the output of the regulator is referenced to a voltage level other than ground.

In addition to damage due to excessive current flow, switching regulators are also susceptible to thermal damage. While all of the components are susceptible to thermal damage, the regulator switch is particularly susceptible to such damage. For example, the high current flow passing through the switch when it is constantly loaded at or near its rated load produces heat. When the current generated heat is combined with the ambient heat surrounding the regulator, the resulting temperature may exceed the thermal limit of the regulation switch. In such cases, the regulator switch may be damaged or destroyed.

Thus, it is yet another object of this invention to provide a thermally protected switching regulator.

It is still another object of this invention to provide a switching regulator that is both overload and thermally protected.

SUMMARY OF THE INVENTION

In accordance with this invention, an overload protected switching regulator for applying DC power to a load is provided. A power switch, connected to control the flow of current between the DC input and the output of the regulator, is closed at a fixed rate each time a flip-flop is set by a pulse produced by an oscillator. When the regulator is operating at its rated current load, or less, a voltage detector connected to detect the output voltage of the regulator delivers a reset pulse to the flip-flop during each period of oscillation. The timing of the reset pulse is such that the open/closed ratio of the power switch is exactly the ratio required to maintain the output voltage at the desired value. If the load changes, the timing of the reset pulse changes in a manner that maintains the output voltage at the desired value. The overload protected switching regulator also includes a current limit detector for detecting the current flow through the power switch. In the event of a short on the output of the regulator or the application of a load that causes a current flow greater than the rated current of the switch, the current limit detector produces a pulse that resets the flip-flop prior to the voltage detector producing a reset pulse. As a result, current flow is limited.

In accordance with further aspects of this invention, the current limit detector detects the voltage drop across a resistor connected in series with the power switch. The current limit detector produces a voltage that tracks the current flow through the resistor. Since the power switch is switched on and off, the current flow has a generally sawtooth waveform. The tracking voltage has a similar waveform. As soon as the tracking voltage ramps to a predetermined level, the current limit detector produces the reset-pulse that resets the flip-flop.

In accordance with other aspects of this invention, a thermal detector senses the temperature at a critical location (or locations) in the overload protected switching regulator. The thermal detector is connected to the voltage detector and causes the voltage detector to deliver a reset hold signal to the flip-flop when the temperature at the sensed location exceeds a predetermined level. The reset hold signal holds the flip-flop in the reset state until the temperature drops below the predetermined level.

In accordance with still further aspects of this invention, preferably, the main element of the oscillator, the flip-flop, the current limit detector and the voltage detector is a difference amplifier. Further, the four difference amplifiers are the elements of a difference amplifier based quad comparator integrated circuit. Discrete components are connected to the difference amplifiers to create the desired oscillator, current limit detector, flip-flop and voltage detector circuits.

In accordance with yet further aspects of the invention, the overload protected switching regulator includes an input filter that limits the propagation of electromagnetic interference to the power bus supplying power to the voltage regulator and protects the regulator components from damage due to high voltage transient spikes on the power bus. In addition, the switching regulator includes an output filter that converts the pulsating DC current flow through the power switch to steady DC, i.e., DC with a small ripple component.

As will be readily appreciated from the foregoing description, the invention provides a new and improved switching regulator. More specifically, the invention provides an overload protected switching regulator that is relatively uncomplicated. In this regard, as noted above, the overload protected switching regulator of the invention is preferably implemented in integrated circuit form using as its main element a quad comparator. Moreover, the invention is suitable for use (with slight implementation changes) in environments wherein the regulator output voltage is referenced to ground and in environments where the regulator output voltage is referenced to some level other than ground, such as the regulator input voltage.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings wherein.

DESCRIPTION OF THE PREFERRED EMBODIMENTS

Figure 1:
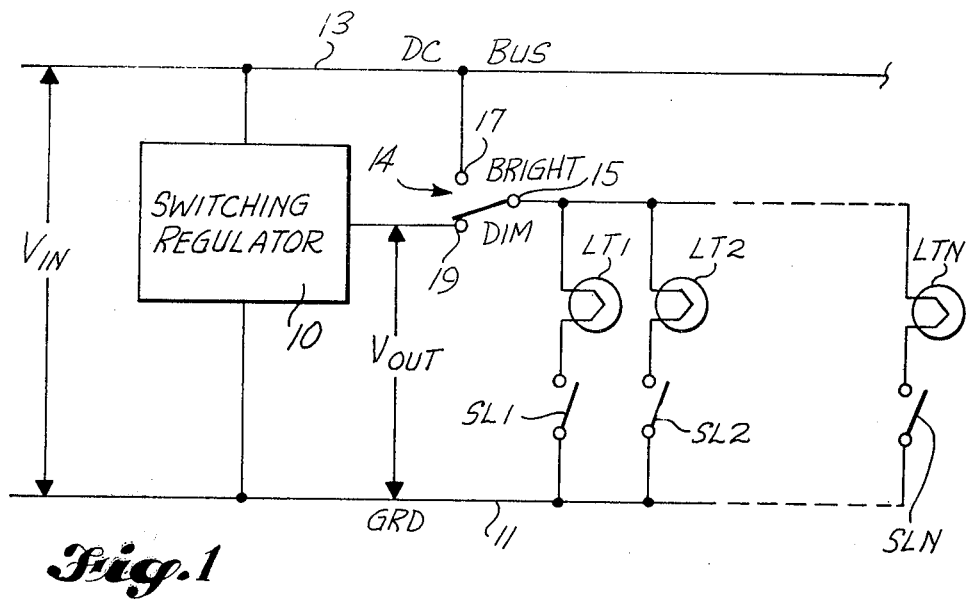
FIG. 1 is a block diagram illustrating a switching regulator referenced to ground connected to a load.
Figure 2:
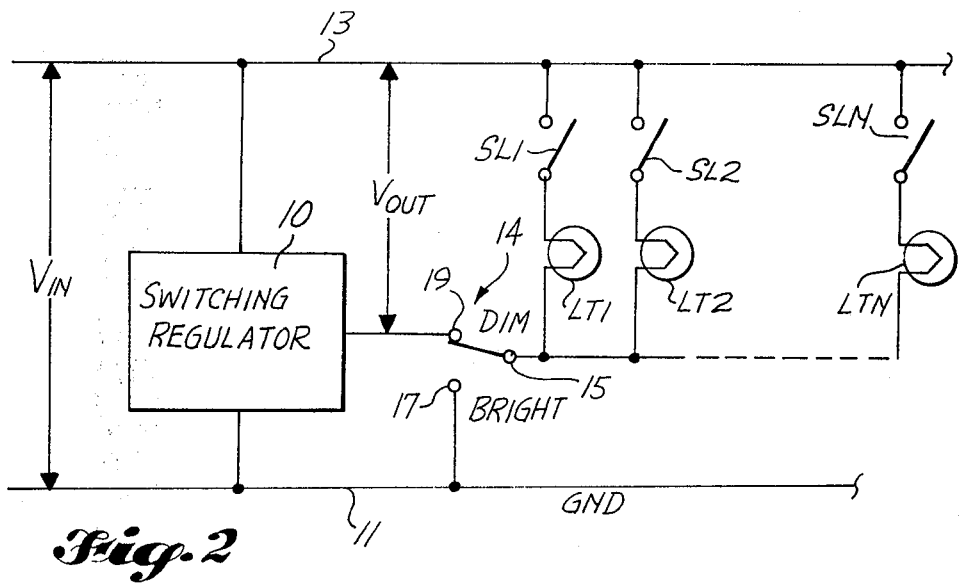
FIG. 2 is a block diagram illustrating a switching regulator referenced to the regulator input voltage connected to a load.

FIGS. 1 and 2 illustrate the use of a switching regulator 10 in two different environments. In FIG. 1, the output of the switching regulator ($V_{OUT}$) is referenced to ground and in FIG. 2 the output of the switching regulator ($V_{OUT}$) is referenced to the DC input of the regulator. In both environments, the absolute value of $V_{OUT}$ may be identical, of course.

The environments illustrated in FIGS. 1 and 2 may control the application of power to the same types of loads. For example, both types of regulators are used in the 747 airplane produced by The Boeing Company, Seattle, Wash., to control the dimming of annunciator lamps. In both environments the lamps LT1, LT2—LTN are each connected in series with a switch element, illustrated schematically in FIGS. 1 and 2 as a simple single-pole, single-throw (SPST), off-on, switch SL1, SL2—SLN. In actuality, the switches may take on a variety of well-known forms, such as pressure switches, limit switches, semiconductor switches, etc. In any event, the series connected lights and switches are connected in parallel. The switch side of the parallel combination is connected to the reference voltage associated with the switching regulator. In the case of FIG. 1, the reference voltage is ground 11 and in the case of FIG. 2 the reference voltage is the DC bus 13. The light side of the parallel combination is connected to the common terminal 15 of a single-pole, double-throw (SPDT) switch 14. In the case of FIG. 1, one remote terminal 17 of S, denoted the BRIGHT terminal, is connected to the DC bus 13 and the other remote terminal 19, denoted the DIM terminal, is connected to the output of the switching regulator 10. The input of the switching regulator 10 is, of course, connected between the DC bus 13 and ground 11. In the case of FIG. 2, the DIM terminal 19 is connected to the output of the switching regulator 10 and the BRIGHT terminal 17 is connected to ground 11. Again, the input of the switching regulator 10 is connected between the DC bus 13 and ground 11.

In FIGS. 1 and 2, the input voltage to the switching regulator 10 is denoted $V_{IN}$ and may be the same in both FIGURES. The output voltage, $V_{OUT}$, in the case of FIG. 1 is between the output of the switching regulator and ground and in the case of FIG. 2 is between the output of the switching regulator and the DC bus. While the output voltages are taken across different terminals, the absolute value of $V_{OUT}$ may be the same in both FIGURES.

In both of the environments illustrated in FIGS. 1 and 2 the regulator load is determined by the number of switches ST1, ST2—STN that are closed. The more switches closed the greater the load since the total resistance of the parallel connected lamps decreases as the number of energized lamps increases.

In addition to being switched on and off by the SPST switches, the lamps can be switched from bright to dim using the SPDT switch 14. When the entire input voltage is applied across the lamps, the lamps are in their bright state. In this case, the common terminal of the SPDT switch 14 is connected to the BRIGHT remote terminal 17. Contrariwise, when the common terminal 15 of the SPDT switch 14 is connected to the DIM remote terminal (which is connected to the output of the switching regulator), the lamps are in their dim state.

Regardless of the environment in which a switching regulator is used, i.e., in a FIG. 1 environment or a FIG. 2 environment, if a short occurs between the common terminal of the SPDT switch 14 and ground in the case of FIG. 1 or the DC bus in the case of FIG. 2, the current flow through the regulator will tend to be greater than the regulator's design value. A lesser current flow, but a current flow greater than design value, tends to occur if a load greater than the design load is connected to the output of the regulator. This condition may result from connecting too many bulbs in parallel or by using bulbs with too low of a resistance. In either case (e.g., short or excessive load), the excessively high power drawn through the switching regulator can damage, or destroy, the regulator. The hereinafter described overload protected switching regulators formed in accordance with the invention prevent this result from occurring.

Figure 3:
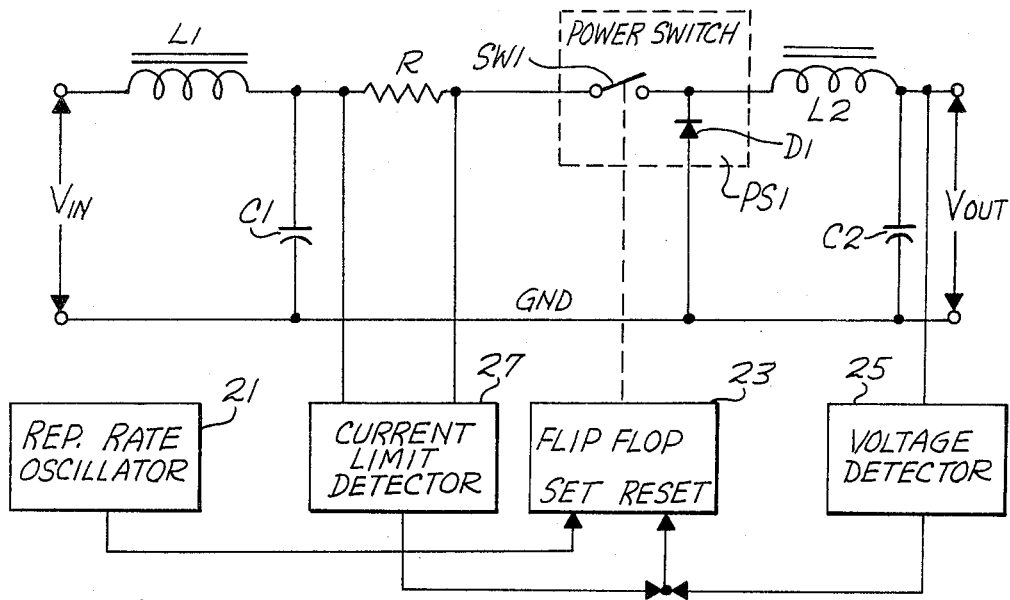
FIG. 3 is a partially block and partially schematic diagram of a switching regulator formed in accordance with the invention suitable for use in an environment of the type illustrated in FIG. 1.

FIG. 3 is a partially block and partially schematic diagram of an overload protected switching regulator formed in accordance with the invention suitable for use in environments of the type illustrated in FIG. 1. The overload protected switching regulator illustrated in FIG. 3 comprises: two inductors designated L1 and L2; two capacitors designated C1 and C2; a current sensing resistor designated R; a power switch designated PS1; a repetition rate oscillator 21; a flip-flop 23; a voltage detector 25; and, a current limit detector 27. The DC bus is connected through L1 in series with C1 to ground. The junction between L1 and C1 is connected to one end of R. The other end of R is connected to the power input of the PS1. PS1 is shown in FIG. 3 in functional form as comprising a single-pole, single-throw (SPST) switch designated SW1 and a diode designated D1. The end of R connected to PS1 is connected to one terminal of SW1. The other terminal of SW1 is connected to one end of L2. The other end of L2 is connected through C2 to ground. The regulated output voltage ($V_{OUT}$) is taken across C2. The cathode of D1 is connected to the junction between SW1 and L2 and the anode of D1 is connected to ground.

The current limit detector 27 includes two inputs, one connected to each side of R. The junction between L2 and C2 is connected to the input of the voltage detector 25. The output of the repetition rate oscillator 21 is connected to the set input of the flip-flop 23 and the outputs of the voltage detector 25 and the current limit detector 27 are both connected to the reset input of the flip-flop 23. The flip-flop 23 controls the open/closed state of SW1.

L1 and C1 form an input filter that limits the propagation of electromagnetic interference to the DC bus 13 (FIGS. 1 and 2) from the regulator. The input filter also protects the regulator components from the effect of high voltage transient spikes occurring on the DC bus. R is a small current sensing resistor that provides a voltage signal to the current limit detector 27 that is proportional to the current flow through the resistor and, thus, the current flow through PS1. L2 stores energy in an expanding flux field when SW1 is closed. When SW1 is open the decay of the flux field in L2 generates a voltage whose polarity and magnitude causes D1 to be forward biased, whereby a continuation of current flow to C2 and the connected load occurs. L2 and C2 constitute a filter that converts the pulsating current through PS1 to a steady DC output, i.e., a DC output with a small ripple component.

The repetition rate oscillator 21 produces pulses at any suitable frequency, such as 4000 Hertz. At the beginning of each oscillation period, the pulse produced by the oscillator 21 sets flip-flop 23 to a stable state. The set stable state causes SW1 to close. When the current through the regulator is the regulator's rated current value, or less, the voltage detector 25 delivers a reset pulse to flip-flop 23 prior to the end of each oscillation period. The timing of the reset pulse is such that the open/closed ratio of SW1 is exactly the ratio required to maintain the level of the output voltage of the regulator at the desired value. By way of example, if the DC bus voltage ($V_{IN}$) fluctuates between 18 and 29.5 volts, and a regulated output voltage ($V_{OUT}$) of 12 volts is desired, the voltage detector 27 produces pulses with a timing such that the voltage across C2 is 12 volts regardless of the DC bus voltage level. If the DC bus voltage level drops, the time between the production of a set pulse by the repetition rate oscillator and the production of a reset pulse by the voltage detector increases. Contrariwise, if the DC bus voltage increases the time between the set and reset pulses decreases. This action occurs as long as the load is such that the current flowing through the regulator stays at or below the regulator's rated current level.

The opening and closing of SW1 causes the waveform of the current flow through the regulator to have a sawtooth shape. (As previously noted, the current is smoothed by the output filter formed by L2 and C2 prior to being applied to the load.) The rate of rise of the sawtooth waveform is, of course, determined by L2 and the voltage across L2 when SW1 is closed. During normal steady state operation at the regulator's rated current level or less, the sawtooth waveform current flow through R never reaches a level that causes the current limit detector 27 to be actuated, i.e., produce an output pulse that resets flip-flop 25. Contrariwise, if the resistance of the load decreases to the point where the current flow through SW1 would rise above SW1's designed peak current level in the absence of any other action, the current limit detector is actuated. More specifically, when such an abnormal load condition occurs, the current limit detector 27 produces a reset pulse. The current limit reset pulse occurs prior to the voltage detector producing a reset pulse. The abnormal load may be a short or a low resistance load, either of which will cause the current limit condition to be achieved.

As will be readily appreciated by those skilled in the art from the foregoing description, the power dissipation stress on SW1 is less under an abnormal load condition than is the power dissipation stress at the maximum rated current of the regulator. As described below, SW1 is in fact a transistor switch. The total power dissipation of SW1 is composed of two parts. One part is due to the on-off switching action and the other part is due to the current flow through SW1's saturation resistance. The part due to switching action is relatively constant at maximum rated load or any degree of abnormal load, predominantly determined by switching off at the same frequency and from the same peak current. The part due to saturation resistance is less at abnormal load than at maximum rated load because the sawtooth current ramps up to the same final peak value in each interval of conduction but does so in a lesser time. As a result, the total power dissipation is less than at full rated load and the switching regulator cannot be overstressed by any abnormal load.

As will be readily appreciated by those skilled in the art and others at this point, the present invention does not require a complicated circuit for sensing the DC current output of the regulator. In addition, the invention provides a soft turn on without any added circuit components. More specifically, many prior art switching regulators that do provide overload protection rely on sensing an overload in the external DC load circuit. The problem with such a sensing arrangement is that excessive internal currents may flow in the regulator, when input power is applied, due to the charging of an output filter capacitance, which is commonly very large. Because external overload sensing cannot be used to control such internal capacitance charging currents, it is common to use separate circuitry to prevent destructive inrush currents from occurring. Circuits employed to control start up inrush currents are known as "soft turn on" circuits. The present invention controls start up inrush currents in the same way and to the same peak current as it controls externally applied overloads. Also, if saturation affects the performance of L2, the resulting high current will be similarly controlled.

Figure 4:
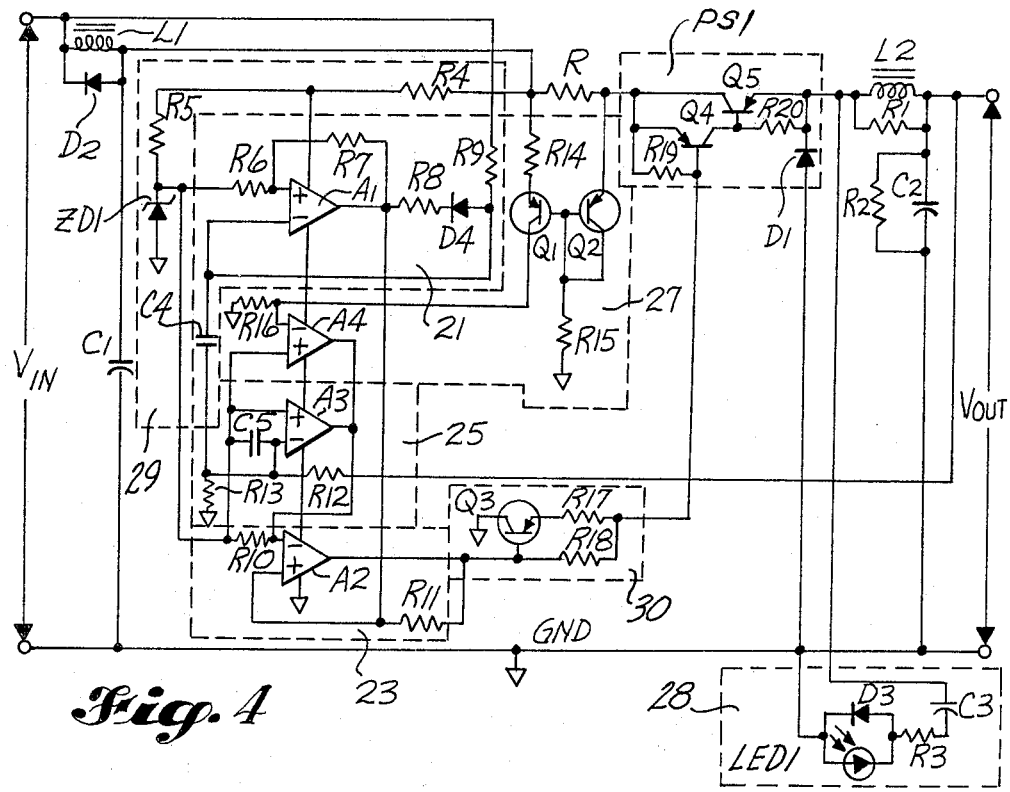
FIG. 4 is a detailed schematic diagram of a switching regulator of the type illustrated in FIG. 3.

FIG. 4 is a schematic diagram illustrating in detail an overload protected switching regulator of the type illustrated in FIG. 3. Prior to describing FIG. 4 in detail it is pointed out that, preferably, the repetition rate oscillator 21, the flip-flop 23, the voltage detector 25 and the current limit detector 27 each include a comparator in the form of a difference amplifier. Preferably, the comparator amplifiers are formed in a single integrated circuit commercially available from a number of sources as a quad comparator. The comparator amplifiers of the repetition rate oscillator 21, the flip-flop 23, the voltage detector 25 and the current limit detector 27 are respectively denoted A1, A2, A3 and A4 in FIG. 4.

In addition to the circuits and elements illustrated in block and schematic form in FIG. 3, FIG. 4 also includes some necessary and/or desirable subsidiary circuits and elements, which are hereinafter described. Of the additional elements, a diode designated D2 is connected in parallel with L1 to provide damping of transient oscillations. A resistor, designated R1, connected in parallel with L2 performs a similar function. Another resistor, designated R2, connected in parallel with C2, provides a small load that is sufficient to cause a hereinafter described illumination circuit 28 to emit light when no external load is connected to the regulator.

The illumination circuit 28 illustrated in FIG. 4 comprises: a capacitor designated C3; a resistor designated R3; a diode designated D3; and, a light emitting diode designated LED1. The junction between PS1 and L2 is connected through C3 to one end of R3. The other end of R3 is connected to the anode of D3 and the cathode of LED1. The cathode of D3 and the anode of LED1 are connected together and to ground. LED1, which preferably emits green light, provides a visual indication of the normal operation of the overload protected switching regulator. In this regard, most failures of switching regulators will result in the power switch, PS1, being either continuously on or continuously off. If either of these conditions occur, no current will flow through C3 and R3 to energize LED1. Contrariwise, when normal on/off switching of PS1 occurs, C3 is charged through D3 and discharged through LED1, whereby LED1 emits light.

FIG. 4 also includes a reference voltage circuit 29 comprising: two resistors designated R4 and R5 and a zener diode designated ZD1. One end of R4 is connected to the junction between L1, C1 and R. The other end of R4 is connected through R5 to the cathode of ZD1. The anode of ZD1 is connected to ground. A reference voltage, taken at the cathode of ZD1 is applied to the repetition rate oscillator 21, the flip-flop 23, the voltage detector 25 and the current limit detector 27 in the manner hereinafter described. In addition, the voltage at junction between R4 and R5 is connected to the positive power terminals of A1, A2, A3 and A4. The negative power terminals are connected to ground in a conventional manner. For purposes of drawing simplicity, these connections are schematically represented by a single line in FIG. 4. Preferably the A1—A4 quad comparator is formed such that the output of each element, i.e., A1, A2, A3 or A4, is the open collector of an NPN transistor with its emitter common to the negative power supply, in this case ground. Moreover, preferably, the gain of each element, A1, A2, A3 and A4 is such that a one millivolt difference across the inputs of the elements will cause the output of the element to be nonconducting or saturated.

The repetition rate oscillator 21 illustrated in FIG. 4 comprises, in addition to A1, a diode designated D4; a capacitor designated C4; and, four resistors designated R6, R7, R8 and R9. The reference voltage at the junction between R5 and ZD1 is connected through R6 to the noninverting input of A1. The output of A1 is connected through R7 to the noninverting input terminal of A1. The output of A1 is also connected through R8 to the cathode of D4. The anode of D4 is connected through R9 to the DC bus input of the regulator. The junction between D4 and R9 is connected to the inverting input of A1 and to one side of C4. The other side of C4 is connected to a tap on a resistor divider forming a portion of the hereinafter described voltage detector 25. The resistor divider is connected between the output terminal of the regulator and ground. Consequently, the signal on the side of C4 remote from the noninverting terminal of A1 tracks the output voltage.

The repetition rate oscillator operates in the manner hereinafter described; the voltage on C4, sensed at the inverting input of A1, is compared to the reference voltage at the noninverting input terminal of A1, determined by ZD1. (By way of example only, in one actual embodiment of the invention the ZD1 reference voltage was chosen to be 6.2 volts.) When the voltage at the inverting input of A1 is less than the voltage at the noninverting input of A1, A1 is in a nonconducting state. When A1 is nonconducting, the voltage at the noninverting input of A1 is the reference voltage value. When this state exists, C4 is discharged through R9. C4 is discharged through R9, rather than charged, because of the way the output of A1 shifts between high and low states. When A1 is nonconducting, its output is high, whereby the voltage at the junction between R9 and D4 moves high. Contrariwise, when A1 is conducting, its output is low, whereby the voltage at the junction between R9 and D4 moves low. The low voltage value at the R9/D4 junction is substantially below the tracked output voltage and the high value is near, but still below, the tracked output voltage. As a result, the charge across C4 decreases when A1 shifts to a nonconducting state. More precisely, C4 is discharged, rather than charged, when the output of A1 shifts to a nonconducting or off state. In summary, the regulating action of the switching regulator tends to maintain the voltage on the side of C4 connected to the output voltage divider at a level nearly equal to the reference voltage developed at the cathode of ZD1. The voltage at the side of C4 connected to R9 change repetitiously between a voltage nearly equal to the reference voltage and a fraction (e.g., one-half) of the reference voltage. Hence, as current flow through R9 causes the R9 side of C4 to approach the reference voltage, the charge on C4 approaches zero, i.e., C4 is discharged. Conversely, as current from the output of A1 (through R8 and D4) causes the R9 side of C4 to approach a fraction of the reference voltage, the charge on C4 is increased, i.e., C4 is charged.

When the voltage at the inverting terminal of A1 becomes more positive than the voltage at the noninverting terminal of A1, A1 becomes conducting and its output voltage drops to a low value, such as 0.2 volts. Feedback through R7 causes the voltage at the noninverting input terminal of A1 to be reduced, preferably to about half the voltage existing at the noninverting input terminal when the output of A1 is conducting. The output of A1 will, thus, remain conducting until the relative polarity across the inverting and noninverting terminals of A1 is reversed. Current through R8 and D4 will now increase the charge on C4, reducing the voltage at the inverting input terminal of A1 with a time constant that is very fast compared to the discharging of C4 through R9. When the voltage at the inverting input terminal of A1 is reduced to less than the voltage at the noninverting input terminal of A1, the output of A1 goes high (i.e., becomes nonconducting). When the output of A1 rises, the feedback through R7 is removed, allowing the voltage at the noninverting input terminal of A1 to rise back to the reference voltage. This starts another cycle of oscillation with the voltage on C4 again discharging through R9. In one actual embodiment of the invention wherein the reference voltage was 6.2 volts and the "on" (conducting) output voltage of A1 was 0.2 volts, the total period of oscillation was 250 microseconds (i.e., 4000 Hz) with the charge through R8 and D4 occurring during two percent of the period. Thus, the oscillator produced a negative pulse output with a two percent duty cycle.

The flip-flop 23, in addition to including A2, includes two resistors designated R10 and R11. The junction between R5 and ZD1 is connected through R10 to the inverting input terminal of A2. The output of A2 is connected through R11 to the noninverting input terminal of A2. The output of A1 is also connected to the noninverting input terminal of A2.

As a result of the foregoing arrangement, the inverting input terminal of A2 is referenced through R10 to the same voltage reference applied to the repetition rate oscillator 21. R11 provides positive feedback from the output of A2 to the noninverting input terminal of A2. This positive feedback will cause the output of A2 to remain either in a conducting or a nonconducting state, as determined by the most recent set or reset pulse input. In this regard, direct coupling from the negative pulse output of A1 of the repetition rate oscillator 21 to the noninverting input terminal of A2 of the flip-flop 25 will set the flip-flop to a conducting state at the beginning of each oscillation interval. As will be better understood from the following description of the voltage detector 25 and the current limit detector 27, the outputs of these detectors are connected to the inverting input of A2. A negative pulse on either of these outputs will, thus, reset the flip-flop to a stable nonconducting state.

In addition to A3, the voltage detector 25 includes: a capacitor designated C5; and, two resistors designated R12 and R13. The noninverting input terminal of A3 is connected to the junction between R5 and ZD1. C5 is connected between the inverting input terminal of A3 and the junction between R5 and ZD1. The regulated output ($V_{OUT}$) of the overload protected voltage regulator is connected through R12 in series with R13 to ground. The junction between R12 and R13 is connected to the other side of C4, as previously described, and to the inverting input of A3. Thus, R12 and R13 form the resistor divider discussed during the previous description of the repetition rate oscillator 21 that applies an output tracking voltage to the opposite side of C4. As noted above, preferably, R12 and R13 are chosen such that they divide $V_{OUT}$ down to a value equal to the same general voltage as the reference voltage at the cathode of ZD1—6.2 volts in one actual embodiment of the invention. In addition to this voltage, the inverting input of A3 includes a small sawtooth voltage, derived from the sawtooth voltage that occurs at the input of A1, divided by the capacitive divider formed by C4 and C5. This added sawtooth voltage may have a 65 millivolts peak to peak value, for example.

At the start of each oscillation period, at the same time that the flip-flop 23 is set to a conducting state, the voltage at the inverting input of A3 is reduced by the sawtooth to a few millivolts less than the reference voltage at the noninverting input of A3. With this input relationship, the output of A3 will be in a nonconducting state and, thus, will not affect the status of the flip-flop 23. At some later time in the cycle of operation, the rising sawtooth voltage at the junction between R12 and R13 will exceed the voltage at the noninverting input of A3, causing A3 to conduct. When A3 conducts, its output shifts from a high state to a low state. This negative transition resets the flip-flop 23. In the event that $V_{OUT}$ rises, the flip-flop is reset at an earlier point in the cycle of operation because the sawtooth waveform will reach the trigger point earlier in the cycle. Contrariwise, if $V_{OUT}$ drops, the flip-flop 23 will be reset later in the oscillation cycle because the output of A3 will shift at a later point in the cycle.

The current limit detector 27, in addition to A4, includes: two PNP transistors designated Q1 and Q2; and, three resistors designated R14, R15 and R16. Q1 and Q2 are chosen so as to have similar base/emitter voltage drop characteristics. The junction between R4 and R is connected through R14 to the emitter of Q1. The junction between R and PS1 is connected to the emitter of Q2. The bases of Q1 and Q2 are connected together, to the collector of Q2 and through R15 to ground. The collector of Q1 is connected to the inverting input of A4. The inverting input of A4 is also connected through R16 to ground. The noninverting input of A4 is connected to the junction between R5 and ZD1 and, thus, receives the reference voltage. The output of A4 is connected to the set input of the flip-flop 23, i.e., the inverting input of A2.

Turning now to a description of the operation of the current limit detector 27 illustrated in FIG. 4, R15 provides base current for Q1 and Q2. Q2 serves to maintain the emitter of Q1 at the same potential (plus or minus a few millivolts) as the junction of R, PS1 and the emitter of Q2 by reason of similar base/emitter voltage drop characteristics of Q1 and Q2. As a result, when sawtooth current pulses generate a sawtooth voltage drop across R, a similar sawtooth voltage drop must exist across R14. Correspondingly, the current flow through R14, Q1 and R16 to ground is proportional to the current flow through R.

The voltage at the inverting input of A4 is, thus, at all times proportional to the current through R If this voltage becomes greater than the reference voltage at the noninverting input of A4, A4 is switched to an on or conducting state. As with the other difference amplifiers, when A4 is switched on, its output shifts from a high voltage state to a low voltage state. Since the output of A4 is connected to the inverting input of A2, the switching of A4 to an on or low voltage state resets the flip-flop 23.

The ratio of R14 to R16 establishes the peak current at which current limiting occurs, i.e., the peak current at which A4 shifts to a low state. Preferably, this ratio is set to allow no greater peak current than is required to sustain the desired maximum regulator output current. Under any current limiting condition, the current sawtooth will rise to the same peak as it would at the established maximum regulator current. However, the rate of rise will be more rapid under abnormal loads than under normal loads. The rate of rise is greater because under current limiting conditions, the output voltage sags below its normal regulated value, hence, greater voltage is imposed across L2. Since the closure or repetition rate of the regulator is fixed by the oscillator frequency, each current pulse will be of less duration than at design maximum normal loading since the reset pulse will occur sooner after a set oscillator pulse. As a result, the peak stress on the regulator elements, in particular the power switch PS1, remains constant and the average stress is less under abnormal conditions than under the maximum rated load condition. The average stress is less because the actual power flow to the load is less.

The overload protected switching regulator illustrated in FIG. 4 also includes a current amplifier 30 connected between the output of the flip-flop 23 and the switch control input of the power switch PS1. The current amplifier is included because the input current requirements of a power switch of the type illustrated in FIG. 4 are greater than the output current capability of a flip-flop of the type illustrated in FIG. 4. Obviously, if these items are formed in a different manner such that flip-flop produces an adequate output current, the current amplifier can be eliminated.

The current amplifier 30 illustrated in FIG. 4 comprises: a PNP transistor designated Q3; and, two resistors designated R17 and R18. The output of A2 is connected to the base of Q3 and the collector of Q3 is connected to ground. R17 and R18 are connected in series between the base and the emitter of Q3 and the junction between R17 and R18 is connected to the switch control input of PS1. In operation, when the flip-flop 23 is set, whereby the output of A2 is low, the base of Q3 is pulled to a potential level very near ground. Since A2 is conducting when its output is low, an amplified current is applied to PS1.

The illustrated power switch PS1, in addition to D1, comprises two PNP transistors designated Q4 and Q5; and, two resistors designated R19 and R20. The junction between R and Q2 is connected to the emitter of Q4, the collector of Q5 and one end of R19. The other end of R19 is connected to the base of Q4, which is also connected to the junction between R17 and R18. The collector of Q4 is connected to the base of Q5 and through R20 to the cathode of D1. The junction between R20 and D1 is connected to the emitter of Q5 and to L2.

In summary, the repetition rate oscillator 21 produces negative going pulses at a predetermined frequency rate. Each time a pulse occurs, the flip-flop 23 is set. When the flip-flop 23 is set, PS1 allows current to flow through the regulator. During normal operation, the voltage detector 25 produces a negative going reset pulse prior to the end of the oscillation cycle. When an abnormal load is connected to the output of the voltage regulator, i.e., a load having a resistance value so low that the current flow through the regulator will exceed the regulator's rated value in the absence of any other action, the current limit detector 27 produces a negative going reset pulse prior to the voltage detector 23 producing a reset pulse. As a result, the voltage regulator is protected by being limited to a peak current value. In fact, under abnormal load conditions, the average power conducted by the regulator is actually less than the average power conducted when the load connected to the output of the regulator causes maximum rated current flow.

Figure 5:
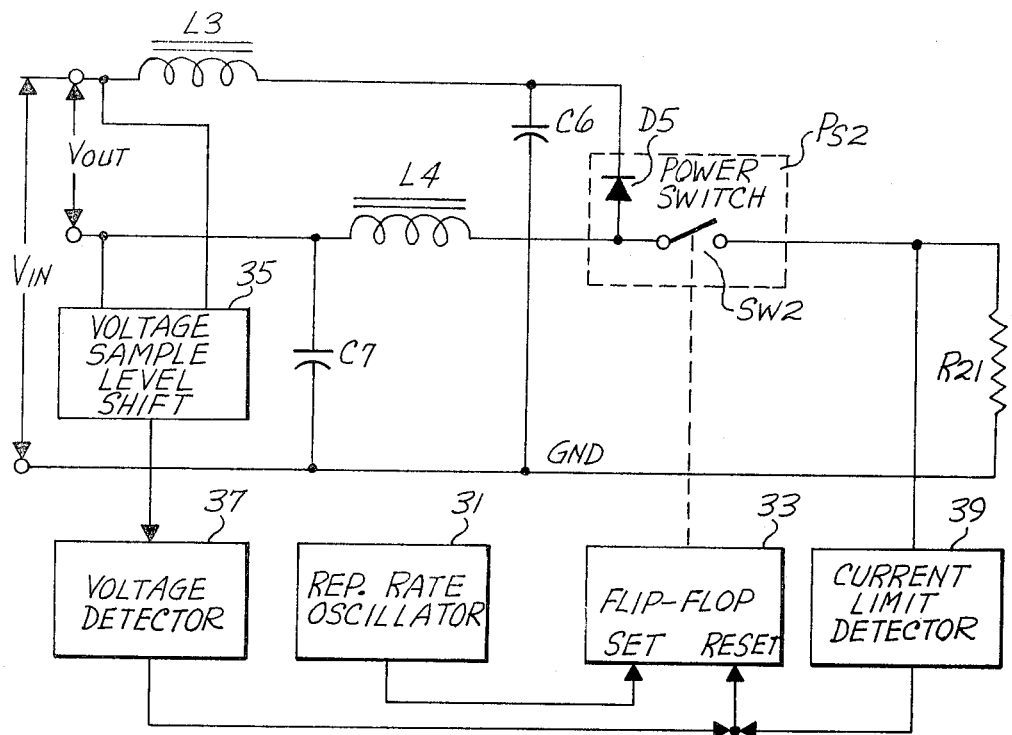
FIG. 5 is a partially schematic and partially block diagram of a switching regulator formed in accordance with the invention suitable for use in an environment of the type illustrated in FIG. 2.

FIG. 5 illustrates an overload protected switching regulator formed in accordance with the invention suitable for use in circuit environments of the type illustrated in FIG. 2 and heretofore described. The overload protected switching regulator illustrated in FIG. 5 comprises: two inductors designated L3 and L4; two capacitors designated C6 and C7; a power switch designated PS2; a current sensing resistor designated R21; a repetition rate oscillator 31; a flip-flop 33; a voltage sample level shift circuit 35; a voltage detector 37; and, a current limit detector 39. The power switch PS2 is schematically illustrated as comprising an SPST switch designated SW2 and a diode designated D5.

The DC bus is connected through L3 in series with C6 to ground. The junction between L3 and C6 is connected to the cathode of D5. The anode of D5 is connected to one side of SW2. The other side of SW2 is connected through R21 to ground. The junction between the anode of D5 and SW2 is also connected through L4 in series wth C7 to ground. The voltage sample level shift circuit 35 includes two inputs, one connected to the DC bus input terminal and the other connected to the regulated output terminal. Thus, the voltage sample level shift circuit 35 receives the output voltage ($V_{OUT}$). The output of the voltage sample level shift circuit 35 is connected to the input of the voltage detector 37. The junction between SW2 and R21 is connected to the input of the current limit detector 39.

The output of the repetition rate oscillator 31 is connected to the set input of the flip-flop 33. The output of the voltage detector 37 and the output of the current limit detector 39 are connected to the reset input of the flip-flop 33. The flip-flop 33 control the open/closed state of SW2. When the flip-flop is set, SW2 is closed and when the flip-flop is reset, SW2 is open.

The overload protected switching regulator illustrated in FIG. 5 operates in the same manner as the overload protected switching regulator illustrated in FIG. 3 with some minor changes in the circuit structure required by the different operating environment. In this regard, L3 and C6 form an input filter that limits the propagation of electromagnetic interference from the regulator to the DC bus and protects the regulator components against high voltage transient spikes occurring on the DC bus. L4 and C7 form an output filter which converts the pulsating DC current through PS2 to steady DC, i.e., DC with a negligible ripple component. L4 also stores energy in an expanding flux field when PS2 is closed. When PS2 is open, the decay of the flux field in L4 generates a voltage of polarity and magnitude that forward biases D5 such that current flow to C7 and the load continues.

As with the embodiment of the invention illustrated in FIG. 3 and as noted above, the open/closed state of SW2 is controlled by the set/reset state of the flip-flop 33. When the flip-flop is set, SW2 is closed; and, when the flip-flop 33 is reset, SW2 is open. As with the embodiment of the invention heretofore described, the repetition rate oscillator 31 produces a negative going pulse train that is applied to the set input of the flip-flop 33. As a result, the flip-flop 33 is set at the frequency of the repetition rate oscillator 31. Also, as with the embodiment of the invention heretofore described, the voltage detector 37 and the current limit detector 39 produce negative going flip-flop reset pulses based either on the size of the load in the case of the voltage detector or the achieving of the current limiting condition in the case of the current limit detector.

The major difference between the embodiment of the invention illustrated in FIG. 5 and the embodiment of the invention illustrated in FIG. 3 resides in the detection of the output voltage ($V_{OUT}$) by the voltage detector 37 and the current limiting condition by the current limit detector 39. In this regard, the purpose of the switching regulator illustrated in FIG. 2 is to maintain $V_{OUT}$ at a predetermined level with respect to the input voltage. That is, the output voltage is referenced to the point voltage, rather than ground. If the DC bus voltage is assumed to be 28 volts, for example, the desired regulated DC output may be 12 volts with respect to the bus voltage. In this case, the output voltage with respect to ground, i.e., the voltage drop across C7 is 16 volts. In order to couple a sample of an output voltage ($V_{OUT}$) of the type illustrated in FIG. 2 to the voltage detector 37, a voltage level shift is required. This function is provided by the voltage sample level shift circuit 35, which is hereinafter described in detail.

As with the embodiment of the invention heretofore described, the current limit detector 39 requires a voltage proportional to the current flow through PS2. Such a voltage is developed across R21. Since R21 is already referenced to ground, i.e., one end of R21 is connected to ground, the voltage drop across R21 is directly usable by the current limit detector 39.

Figure 6:
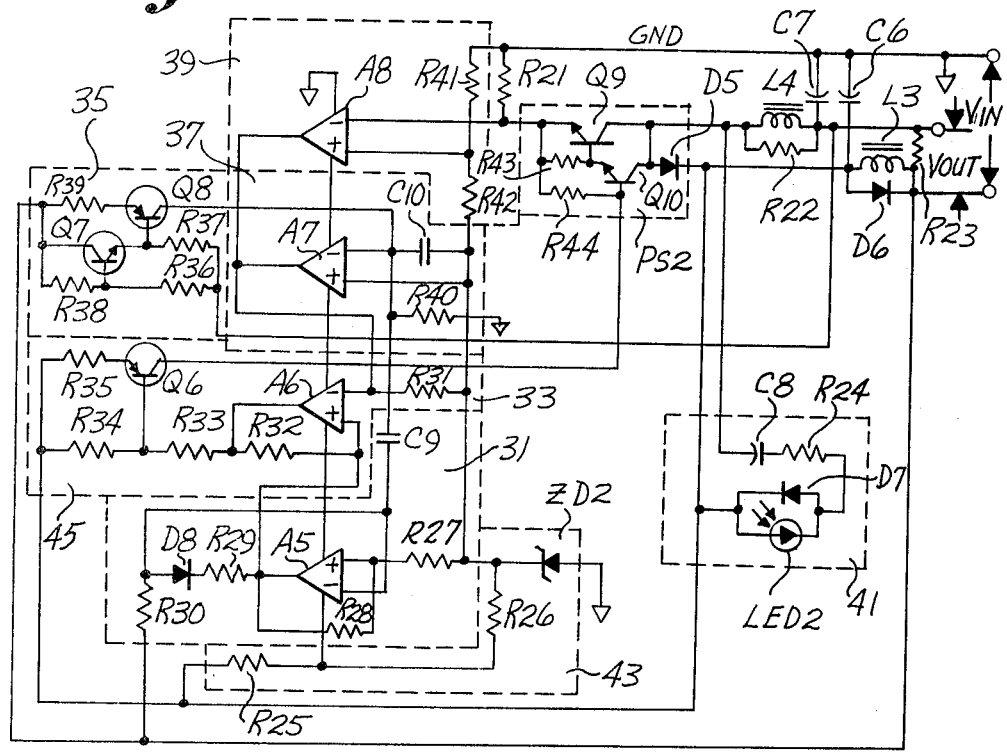
FIG. 6 is a detailed schematic diagram of a switching regulator of the type illustrated in FIG. 5; and, FIG. 7 is a schematic diagram showing a thermal detector addition to the switching regulator illustrated in FIG. 4.

FIG. 6 illustrates in detail an embodiment of the invention of the type illustrated in FIG. 5 and is next described. The components illustrated in FIG. 6 that are also illustrated in FIG. 5 have the same reference numbers. Moreover, additional subsidiary elements and circuits of the type illustrated in FIG. 4 and heretofore described are also included in FIG. 6. In this regard, a diode, designated D6, is connected in parallel with L3 to damp the transient ringing of L3; and, a resistor, designated R22, is connected in parallel with L4 to perform a generally similar function. Also, a resistor, designated R23, is connected across the output of the voltage regulator to create a small load sufficient to cause an indicator circuit 41 to produce a visual indication that the regulator is operative when no external load is connected to the regulator. As with FIG. 4, the indication circuit 41 includes a light emitting diode designated LED2; a capacitor designated C8; a resistor designated R24 and a diode designated D7. The junction between PS2 and L4 is connected through C8 to one end of R24. The other end of R24 is connected to the anode of D7 and the cathode of LED2. The cathode of D7 and the anode of LED2 are connected together and to the junction between PS2 and L3. As with FIG. 4, when normal on/off switching of PS2 occurs, C8 is discharged through D7 and charged through LED2 to cause LED2 to emit light.

FIG. 6 also includes a voltage reference circuit 43 comprising first and second resistors designated R25 and R26; and, a zener diode designated ZD2. One end of R25 is connected to the junction between PS2 and L3 and, thus, receives the filtered bus voltage. The other end of R25 is connected through R26 to the cathode of ZD2. The anode of ZD2 is connected to ground. The junction between R25 and R26 is connected to the positive power input terminal of four difference amplifiers denoted A5, A6, A7 and A8. The negative power input terminal is connected to ground. As with FIG. 4, these connections are represented by a single line in FIG. 6 for purposes of drawing simplification. A5, A6, A7 and A8 each form an element of the repetition rate oscillator 31, the flip-flop 33, the voltage detector 37 and the current limit detector 39, respectively, as hereinafter described in more detail. Further, preferably, A5, A6, A7 and A8 each form one element of a conventional quad comparator integrated circuit.

As with the repetition rate oscillator 21 illustrated in FIG. 4 and heretofore described, the repetition rate oscillator 31 illustrated in FIG. 6, in addition to the difference amplifier A5, includes: a capacitor designated C9; a diode designated D8; and, four resistors designated R27, R28, R29 and R30. The cathode of ZD2 is connected through R27 to the noninverting input of A5. The noninverting input of A5 is also connected through R28 to the output of A5. The output of A5 is also connected through R29 to the cathode of D8. The anode of D8 is connected through R30 to the DC bus input terminal of the voltage regulator. Finally, the inverting input of A5 is connected to one side of C9 and to the junction between R30 and D8. The other side of C9 is connected to a hereinafter described point that follows the regulator output voltage ($V_{OUT}$). In this regard, rather than being connected to the tap of a simple resistor divider, as in FIG. 4, the other side of C9 is connected to the output of the voltage sample level shift circuit. However, the functional operation remains the same, i.e., the other side of C9 "tracks" the regulator output voltage.

Since the operation of the repetition rate oscillator 31 illustrated in FIG. 6 is the same as the operation of the repetition rate oscillator 21 illustrated in FIG. 4 and heretofore described, such operation will not be described.

The flip-flop 33 illustrated in FIG. 6, in addition to A6, includes two resistors designated R31 and R32. The inverting input of A6 is connected through R31 to the cathode of ZD2 and, thus, receives a reference voltage. The output of A6 is connected through R32 to the noninverting input of A6. The noninverting input of A6 is also connected to the output of A5. Finally, as will be better understood from the following description, the outputs of the voltage detector 37 and the current limit detector 39 are connected to the inverting input of A6. Again, since the flip-flop illustrated in FIG. 6 operates in the same manner as the flip-flop 23 illustrated in FIG. 4, such operation will not be described here.

FIG. 6 also includes a power amplifier circuit 45 somewhat similar to the power amplifier 30 illustrated in FIG. 4 and therefore described. The power amplifier 45 includes three resistors designated R33, R34 and R35 and a PNP transistor designated Q6. The output of A6 is connected through R33 to the base of Q6. The base of Q6 is also connected through R34 in series with R35 to the emitter of Q6. The junction between R34 and R35 is connected to the junction between PS2 and L3 and, thus, receives the filtered DC bus voltage. The collector of Q6 is connected to the control input of PS2. The power amplifier 43 operates in the manner hereinafter described to raise the signal output of the flip-flop 33 to a level suitable for controlling PS2.

As previously noted, one of the major differences between the embodiment of the invention illustrated in FIGS. 5 and 6 and the embodiment of the invention illustrated in FIGS. 3 and 4 resides in the inclusion of a voltage level shifting circuit. In the illustrated embodiment of the invention, the DC voltage level shifting is accomplished by the voltage sample level shift circuit 35, which is illustrated in FIG. 6 as comprising: an NPN transistor designated Q7; a PNP transistor designated Q8; and, four resistors designated R36, R37, R38 and R39. One end of each of R36 and R37 is connected to the junction between L4 and C7 and, thus, the regulated output voltage ($V_{OUT}$). The other end of R36 is connected to the base of Q7. The other end of R37 is connected to the base of Q8 and the emitter of Q7. R38 is connected between the base and collector of Q7 and R39 is connected between the collector of Q7 and the emitter of Q8. The collector of Q7 is also connected to receive the DC bus voltage applied to the voltage regulator. The collector of Q8 is connected to the voltage detector 37.

Prior to describing the operation of the voltage sample level shift circuit 35, a description of the voltage detector 37 illustrated in FIG. 6 is set forth. In this regard, in addition to A7, the voltage detector 37 comprises a resistor designated R40 and a capacitor designated C10. C10 is connected between the inverting input of A7 and the cathode of ZD2. The noninverting input of A7 is also connected to the cathode of ZD2. The inverting input of A7 is also connected through R40 to ground and to the collector of Q8. The output of A7 is connected to the set input of the flip-flop 33, i.e., the inverting input of A6.

Turning now to a description of the operation of the voltage sample level shift 35 and the voltage detector 37, Q7 and Q8 shift and invert the voltage level of the output voltage ($V_{OUT}$) of the regulator (taken across R23). R36 and R38 divide out a sample voltage, preferably equal to approximately half of $V_{OUT}$. Q7 and Q8 produce a voltage at the emitter of Q8 that is temperature compensated for the base/emitter voltage change and closely tracks any change in the voltage at the junction of R36 and R38. Thus, the voltage at the emitter of Q8 tracks $V_{OUT}$. The current through R39 is thus proportional to the regulated output voltage and the same current, passing through R40 produces a voltage across R40 that is proportional (i.e., tracks) $V_{OUT}$, but is of opposite voltage polarity. Consequently, when $V_{OUT}$ becomes more negative, relative to $V_{IN}$, the voltage at the inverting input of A7 becomes more positive. As a result, the voltage detector 37 operates in the same manner as the voltage detector 25 illustrated in FIG. 4 and heretofore described. (As noted above with this arrangement, the other side of C9, i.e., the side remote from the inverting input of A5, suitably tracks the output voltage $V_{OUT}$.)

As also noted above, one of the differences between the embodiment of the invention illustrated in FIGS. 5 and 6 and the embodiment of the invention illustrated in FIGS. 3 and 4 is that the current limit detector input voltage, which is proportional to the current through PS2, is directly developed across R21. As illustrated in FIG. 6, this voltage is directly applied to the inverting input of A8, which forms the main component of the current limit detector 39. In addition to A8, the current limit detector A8 includes two resistors designated R41 and R42, connected in series to divide the reference voltage. More specifically, R41 and R42 are connected in series between the cathode of ZD2 and ground. The junction between R41 and R42 is connected to the noninverting input of A8. The current limit detector 39 functions in the same manner as the current limit detector 27 illustrated in FIGS. 3 and 4 and heretofore described. Specifically, when the current through PS2 starts to pass the rated current limit of the regulator, the related voltage on the inverting input of A8 is greater than the divided down reference voltage on the noninverting input. Thus, A8 is turned on and a reset pulse occurs. Since the output of A8 is connected to the reset input of the flip-flop 33, i.e., the inverting input of A6, the flip-flop is immediately reset and PS2 is opened.

Finally, the power switch, PS2, illustrated in FIG. 6, in addition to D5, includes: two NPN transistors designated Q9 and Q10; and, two resistors designated R43 and R44. The emitter of Q6 is connected to the base of Q10. The base of Q10 is connected through R44 in series with R43 to the emitter of Q10. The emitter of Q10 is also connected to the base of Q9 and the emitter of Q9 is connected to the junction between R43 and R44. The emitter of Q9 is also connected to the junction between R21 and the inverting input of A8. The collector of Q9 is connected to the collector of Q10 and to the anode of D5. The cathode of D5 is connected to the junction between C6 and L3, as noted above. The collectors of Q9 and Q10 are also connected to L4.

As will be readily appreciated by those skilled in the art, one additional difference between the embodiment of the invention illustrated in FIG. 6 and the embodiment of the invention illustrated in FIG. 4 is the way the output of the flip-flop 33 controls the power transistor Q6 of the power amplifier circuit 45. In this regard, during peak conduction, the base of Q10 may be a volt or two above ground potential. Because of this voltage potential, the output of A6 must be prevented from pulling the base of Q6 down to the saturation voltage of the output of A6, since this would result in diverting considerable drive current away from the base of Q10. R33 is included to avoid this problem. Specifically R33 holds the base of Q6 at a suitable voltage level when A6 is conducting. As a result, Q6 remains unsaturated. With Q6 remaining unsaturated, most of the current through R35 flows to the base of Q10 as drive current.

Figure 7:
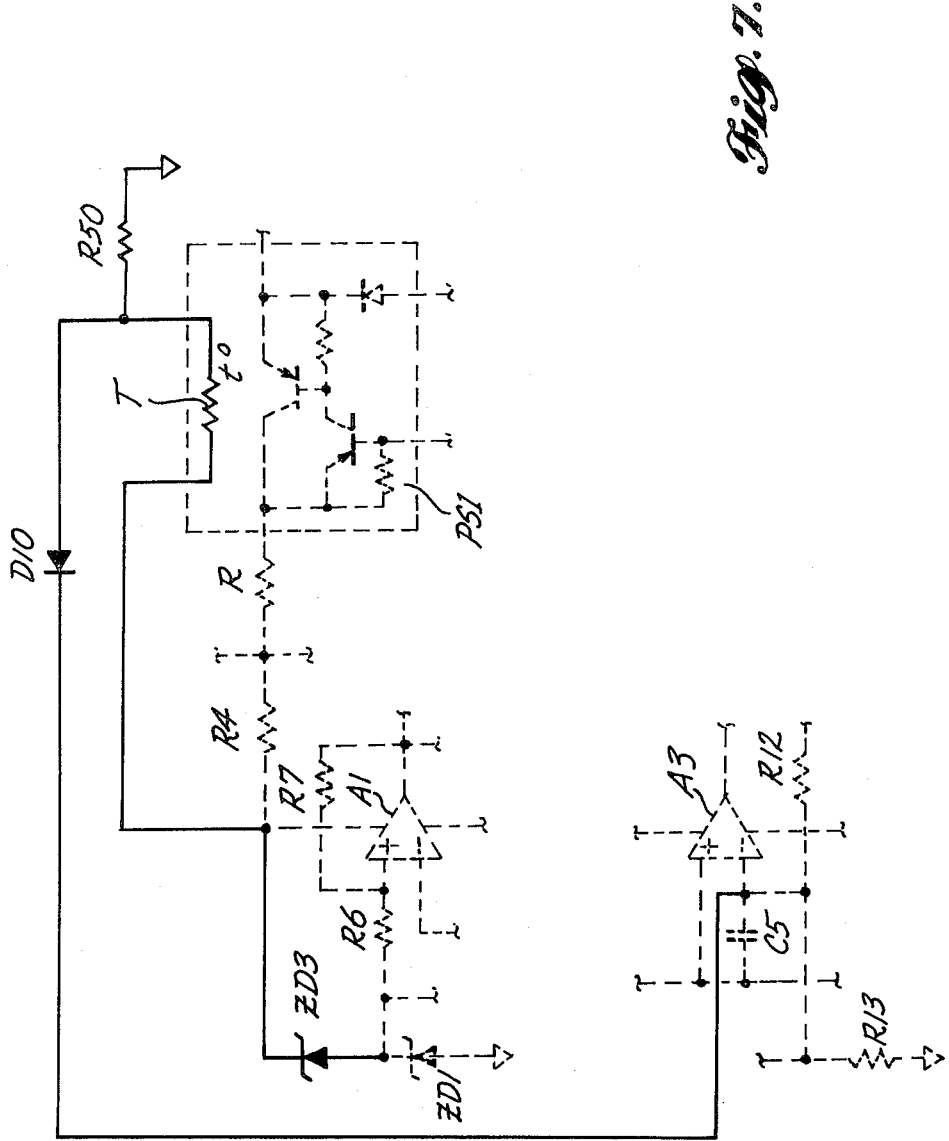

FIG. 7 illustrates how overload protected switching regulators of the type illustrated in FIGS. 3 and 4, and previously described, are thermally protected in accordance with the invention. As noted below, overload protected switching regulators of the type illustrated in FIGS. 5 and 6 can be thermally protected in a similar manner. In addition to illustrating in solid form a thermal detector circuit, FIG. 7 also illustrates in dashed form a portion of the overload protected switching regulator shown in FIG. 4 adequate to show how the thermal detector circuit is to be connected.

The thermal detector circuit illustrated in FIG. 7 comprises: a thermistor designated T; a resistor designated R50; and a diode designated D10. Also illustrated in FIG. 7 is a zener diode designated ZD3, which replaces R5 in the overload protected switching regulator illustrated in FIG. 4. Specifically, the anode of ZD3 is connected to the junction between the cathode of ZD2 and R6. The cathode of ZD3 is connected to R4 and the positive power terminals of A1, A2, A3 and A4. Thus, A1, A2, A3 and A4 receive regulated, rather than unregulated, power.

The regulated power point, i.e., the junction between the cathode of ZD3 and R4, is connected to one end of the thermistor T. The other end of T is connected through R50 to ground. The junction between T and R50 is connected to the anode of D10. The cathode of D10 is connected to the inverting input of A3 (the comparator amplifier of the voltage detector).

The thermistor T is positioned adjacent the component or components to be thermally protected. If two spaced apart components are to be thermally protected, two thermal detector circuits of the type illustrated in FIG. 7 can be included. In any event, since the component most likely to require thermal protection in a switching regulator is the power switch, FIG. 7 illustrates T positioned adjacent to PS1.

T is chosen to have a negative temperature coefficient, whereby the voltage at the junction between T and R50 increases as the temperature sensed by T increases. The junction voltage is such that under normal temperature conditions it is inadequate to affect the previously described normal operation of the voltage detector. Conversely, if the temperature detected by T rises above an acceptable value, the voltage at the junction between T and R50 rises to a level that places A3 in a conducting state. As a result, the output of A3 is forced low. This low shifts the flip-flop 23 into a high state and holds the flip-flop in a high state. As a result, PS1 is switched open and remains so until the temperature drops to an acceptable level, at which time normal operation resumes. While somewhat unlikely, it is possible that the sensed temperature could rise to a point just above the level at which A3 is made conductive and drop to a point below that level shortly after PS1 is opened and current flow ends. In this case, A3 would cycle back and forth between conduction and nonconduction similar to the way A4 cycles back and forth during an overload condition. The "knife edge" situation is in contrast to the more usual abnormal situation when the temperature is well above the cut off point, whereby A3 is held conductive for a lengthy period of time due to the long time required for thermal dispersion to occur.

As noted above, the thermal detector circuit illustrated in FIG. 7 is also useful with the overload protected switching regulator illustrated in FIGS. 5 and 6. In this instance, R26 is replaced by ZD3 and the junction between ZD3 and R25 is connected to one end of T. Further, the junction between T and R50 is connected to the inverting input of A7.

As will be readily appreciated from the foregoing description, the invention provides overload protected switching regulators suitable for use in applying power to a load. The regulators are protected from overload by including a current detector for detecting current flow through the switching regulator. Normally, the switching regulator is controlled by a voltage detector that detects the level of the output voltage. Under abnormal load conditions, i.e., when the load is such that the current drawn through the regulator would rise above a predetermined level in the absence of some action, the current limit detector resets the flip-flop and terminats current flow. As a result, the regulator is prevented from being overloaded. The invention also provides for the thermal protection of overload protected switching regulators.

While preferred embodiments of the invention have been illustrated and described, it will be appreciated that various changes can be made therein without departing from the spirit and scope of the invention. For example, while not preferred, the cathode of D10 could be connected to the current limit detector control input (i.e., the inverting input of A4 or A8) rather than the control input of the voltage detector. Consequently, the invention can be practiced otherwise than as specifically described herein.

The embodiments of the invention in which an exclusive property or privilege is claimed are defined as follows:

1. An overload protected switching regulator for regulating the level of voltage supplied to a load by a DC voltage source, said overload protected switching regulator comprising:

a power switch connected to control the flow of current between a DC voltage source and the output of said regulator, the open/closed ratio of said power switch determining the DC output voltage of said regulator;

a single bistable control circuit having a first input for receiving close command signals and a second input for receiving open command signals, said single bistable control circuit coupled to said power switch for controlling the open/closed state of said power switch in response to said open and close command signals;

oscillation means including a repetition rate oscillator for producing close command signals at a predetermined frequency, said close command signals produced by said repetition rate oscillator being applied to said first input of said single bistable control circuit;

voltage detection means for detecting the output of said regulator and normally producing an open command signal after said repetition rate oscillator has produced a close command signal, said open command signals produced by said voltage detection means being applied to said second input of said single bistable control circuit, the time interval between each close command signal produced by said repetition rate oscillator and the subsequent open command signal produced by said voltage detection means controlling the level of the output voltage of said regulator; and, current limit detection means for sensing at a point located between said DC voltage source and said power switch the magnitude of current flow through said power switch and producing an open command signal when said power flow reaches a predetermined level, said open command signals produced by said current limit detection means also being applied to said second input of said single bistable control circuit.

2. An overload protected switching regulator as claimed in claim 1 including an output filter connected across the output of said regulator to smooth the pulsating current flow created by the opening and closing of said power switch and, thus, smooth the output voltage of said regulator.

3. An overload protected switching regulator as claimed in claim 2 wherein said output filter is an L/C filter.

4. An overload protected switching regulator as claimed in claim 1 including a temperature detecting means for detecting temperature in the region of said power switch and creating an open command signal when said temperature in the region of said power switch exceeds a predetermined level, said open command signal produced by said temperature detecting means also being applied to said second input of said single bistable control circuit.

5. An overload protected switching regulator as claimed in claim 4 wherein said temperature detection means produces a temperature control signal that is applied to the input of said said voltage detection means that detects the output of said regulator, said voltage detection means producing said open command signal either in response to the voltage output of said voltage regulator or when the voltage level of said temperature control signal rises above a predetermined level.

6. An overload protected switching regulator as claimed in claim 1 wherein said single bistable control circuit comprises a single flip-flop having set and reset inputs, said single flip-flop being connected to said power switch such that said power switch is closed when said single flip-flop is set and open when said single flip-flop is reset, the set input of said single flip-flop being connected to said repetition rate oscillator for receiving said close command signals and the reset input of said single flip-flop being connected to said voltage detection means and to said current limit detection means for receiving said open command signals.

7. An overload protected switching regulator as claimed in claim 6 wherein:
(1) said oscillation means also includes circuit means for producing a sawtooth waveform signal at said predetermined frequency; and
(2) said voltage detection means comprises a voltage detector connected to said circuit means for receiving said sawtooth waveform signal and to the output of said regulator for receiving the output voltage of said regulator, said voltage detector combining said sawtooth waveform signal with the ouput voltage of said regulator and producing a bilevel output signal, said bilevel output signal of said voltage detector being at a first level when said combined sawtooth waveform signal and the output voltage of said voltage regulator is below a predetermined value and at a second level when said combined sawtooth waveform signal and the output voltage of said voltage regulator reaches or exceeds said predetermined value, said second level forming said open command signal.

8. An overload protected switching regulator as claimed in claim 7 including a thermal detector for detecting the temperature in the region of said power switch and producing a thermal voltage signal whose magnitude is related to said detected temperature, said voltage detector connected to said thermal detector for receiving said thermal voltage signal and producing said second level output when said thermal voltage signal exceeds a predetermined level.

9. An overload protected switching regulator as claimed in claim 7 wherein said current limit detection means comprises a current limit detector that produces a bilevel output signal, the output of said current limit detector being at a first level when the current sensed by said current limit detector is below a predetermined value and a second level when said current sensed by said current limit detector reaches or exceeds said predetermined value, said second level output of said current limit detector forming said open command signal produced by said current limit detection means.

10. An overload protected switching regulator as claimed in claim 9 including a thermal detector for detecting the temperature in the region of said power switch and producing a thermal voltage signal whose magnitude is related to said detected temperature, said voltage detector connected to said thermal detector for receiving said thermal voltage signal and producing said second level output when said thermal voltage signal exceeds a predetermined level.

11. An overload protected switching regulator as claimed in claim 9 wherein each of said single flip-flop, said voltage detector, said current limit detector and said repetition rate oscillator includes a difference amplifier comparator.

12. An overload protected switching regulator as claimed in claim 11 wherein the difference amplifier comparator elements of said single flip-flop, said repetition rate oscillator, said voltage detector and said current limit detector each form one element of a quad comparator integrated circuit.

13. An overload protected switching regulator as claimed in claim 9 including an output filter connected across the output of said regulator to smooth the pulsating current flow created by the opening and closing of said power switch and, thus, smooth the output voltage of said regulator.

14. An overload protected switching regulator as claimed in claim 13 wherein said output filter is an L/C filter.

15. An overload protected switching regulator as claimed in claim 13 including an input filter connected to filter the DC input to said regulator.

16. An overload protected switching regulator as claimed in claim 15 wherein said input filter is an L/C filter.

17. An overload protected switching regulator as claimed in claim 15 wherein the input of said regulator is between a DC bus and ground and the output of said regulator is between an output terminal and ground.

18. An overload protected switching regulator as claimed in claim 15 wherein the input of said regulator is between a DC bus and ground and the output of said regulator is between an output terminal and the DC bus.

19. An overload protected switching regulator as claimed in claim 9 wherein the input of said regulator is between a DC bus and ground and the output of said regulator is between an output terminal and ground.

20. An overload protected switching regulator as claimed in claim 9 wherein the input of said regulator is between a DC bus and ground and the output of said regulator is between an output terminal and the DC bus.

21. An overload protected switching regulator as claimed in claim 1 wherein the input of said regulator is between a DC bus and ground and the output of said regulator is between an output terminal and ground.

22. An overload protected switching regulator as claimed in claim 1 wherein the input of said regulator is between a DC bus and ground and the output of said regulator is between an output terminal and the DC bus.

* * * * *